United States Patent
Colburn et al.

(10) Patent No.: US 10,820,576 B1
(45) Date of Patent: Nov. 3, 2020

(54) PET LEASH ACCESSORY CONFIGURED TO PREVENT AND TEACH THE PET TO STOP PULLING

(71) Applicant: BluLint Inc., Orinda, CA (US)

(72) Inventors: Theodore J. Colburn, Orinda, CA (US); Garrett Hisatake, Orinda, CA (US)

(73) Assignee: BLULINT INC., Orinda, CA (US)

( * ) Notice: Subject to any disclaimer, the term of this patent is extended or adjusted under 35 U.S.C. 154(b) by 177 days.

(21) Appl. No.: 16/182,449

(22) Filed: Nov. 6, 2018

Related U.S. Application Data (60) Provisional application No. 62/582,669, filed on Nov. 7, 2017.

(51) Int. Cl.
*A01K 15/02* (2006.01)
*A01K 27/00* (2006.01)

(52) U.S. Cl.
CPC .......... *A01K 27/009* (2013.01); *A01K 15/021* (2013.01); *A01K 27/005* (2013.01)

(58) Field of Classification Search
CPC .. A01K 27/005; A01K 27/007; A01K 27/009; A01K 15/021; A01K 15/022; A01K 15/023
USPC ......... 119/719, 775, 792–798, 859, 860, 908
See application file for complete search history.

(56) References Cited

U.S. PATENT DOCUMENTS

| | | | |
|---|---|---|---|
| 4,627,385 A * | 12/1986 | Vinci | A01K 15/022 119/718 |
| 5,868,103 A * | 2/1999 | Boyd | A01K 15/021 119/719 |
| 6,003,474 A | 12/1999 | Slater et al. | |
| 6,047,664 A | 4/2000 | Lyerly | |
| 6,053,128 A | 4/2000 | McCulloch | |
| 6,116,192 A | 9/2000 | Hultine et al. | |
| 6,748,902 B1 | 6/2004 | Boesch et al. | |
| 7,644,685 B2 * | 1/2010 | Groh | A01K 15/021 119/856 |
| 7,703,418 B2 | 4/2010 | Henderson | |
| 7,992,525 B1 | 8/2011 | Fisher | |
| 8,091,512 B2 * | 1/2012 | So | A01K 15/021 119/718 |
| 8,402,924 B2 | 3/2013 | Pacheco et al. | |
| 9,185,884 B2 * | 11/2015 | Herrmann | A01K 15/02 |
| 9,398,756 B2 * | 7/2016 | Eckert | B05B 11/0056 |

(Continued)

FOREIGN PATENT DOCUMENTS

FR 2755820 A1 * 5/1998 ............. A01K 15/02

*Primary Examiner* — Kathleen I Alker
*Assistant Examiner* — Danielle A Clerkley
(74) *Attorney, Agent, or Firm* — Davis Wright Tremaine LLP; Heather M. Colburn (57) ABSTRACT

A device for use with a leash and a collar configured to be worn by a pet. The device includes a spray nozzle connected to a tank configured to store a liquid. The device includes first and second connectors configured to be attached to the collar and the leash, respectively. A movable one of the first and second connectors is moved with respect to the tank when the pet pulls on the leash. The device includes an actuator configured to open and close the spray nozzle. The liquid sprays from the tank through the spray nozzle when the spray nozzle is open and remains in the tank when the spray nozzle is closed. The device may include at least one noise-making element or speaker configured to produce at least one warning sound.

23 Claims, 4 Drawing Sheets

(56) References Cited

U.S. PATENT DOCUMENTS

| | | | |
|---|---|---|---|
| 9,861,079 B2* | 1/2018 | Klossner | A01K 15/021 |
| 2006/0037557 A1* | 2/2006 | Gordon | A61D 7/00 |
| | | | 119/654 |
| 2007/0261645 A1* | 11/2007 | Van de Merwe | A01K 27/009 |
| | | | 119/792 |
| 2011/0120387 A1* | 5/2011 | Warkentin | A01K 27/009 |
| | | | 119/719 |
| 2011/0232584 A1 | 9/2011 | Valencia | |
| 2012/0073517 A1* | 3/2012 | Dukes | A01K 27/009 |
| | | | 119/859 |
| 2013/0152869 A1* | 6/2013 | Morton | A01K 27/004 |
| | | | 119/665 |
| 2013/0327280 A1 | 12/2013 | Thalmann | |

* cited by examiner

PET LEASH ACCESSORY CONFIGURED TO PREVENT AND TEACH THE PET TO STOP PULLING

CROSS REFERENCE TO RELATED APPLICATION(S)

This application claims the benefit of U.S. Provisional Application No. 62/582,669, filed on Nov. 7, 2017, which is incorporated herein by reference in its entirety.

BACKGROUND OF THE INVENTION

Field of the Invention

The present invention is directed generally to pet leash accessories.

Description of the Related Art

Pets, such as dogs, often pull on their leashes, which makes walking them difficult and sometimes dangerous. While some pet owners will try to train their pets not to pull, training sometimes simply does not work. Other solutions include prong or shock collars but many pet owners view such devices as cruel and will not use them. Therefore, a need exists for devices configured to help prevent a pet from pulling on its leash. Devices that are not perceived as being cruel to the pet would be particularly desirable. The present application provides these and other advantages as will be apparent from the following detailed description and accompanying figures.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
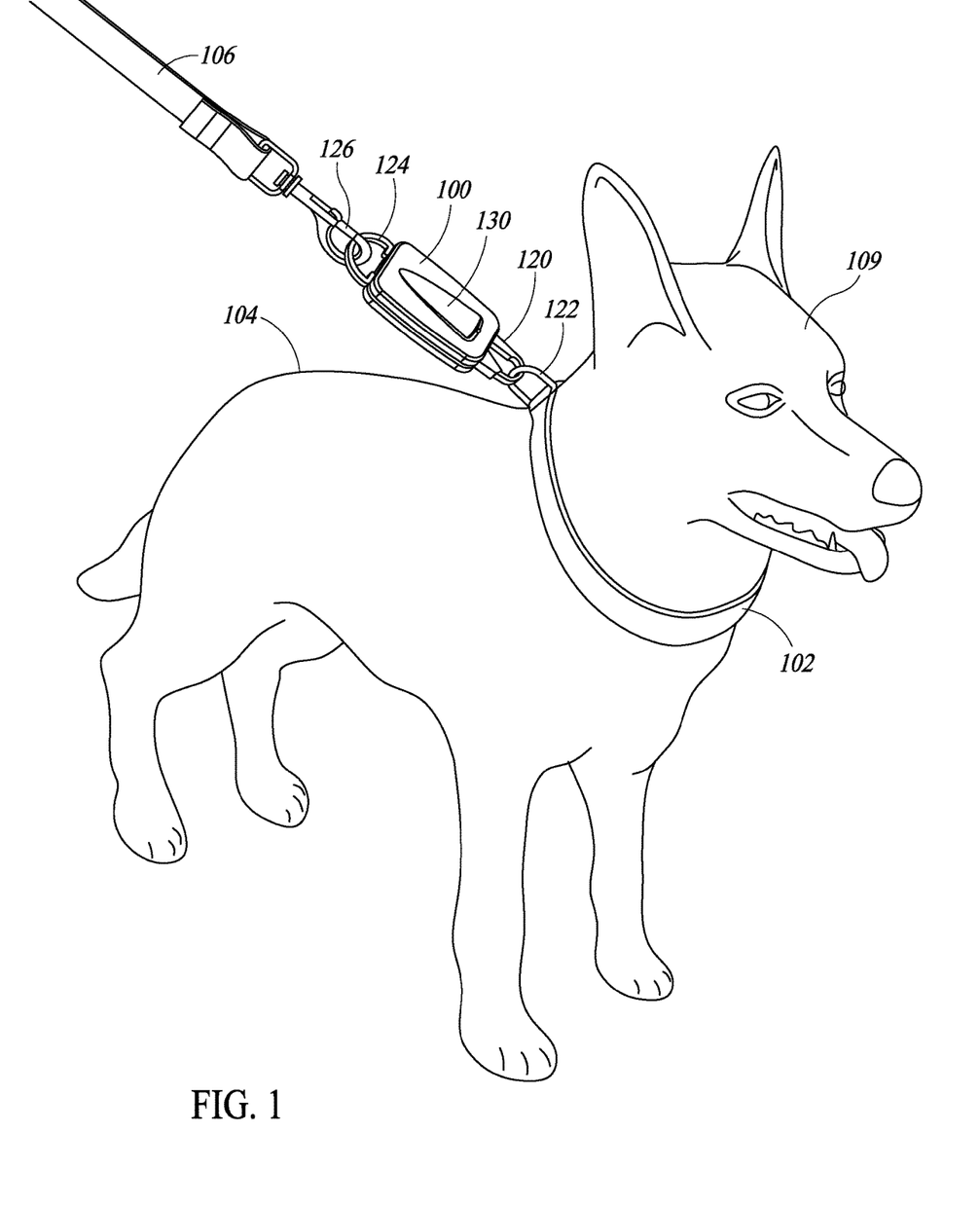
FIG. 1 is a perspective view of a leash accessory device clipped between a pet's collar and the pet's leash.

FIG. 1 is a perspective view of a leash accessory device 100 clipped between a collar 102 worn by a pet 104 (e.g., a dog) and a leash 106. In alternate embodiments, the device 100 may be built directly into the leash 106 and the leash 106 or the device 100 may be clipped to the collar 102. The pet 104 may be any type of animal typically walked on a leash, such as a dog.

The device 100 is configured to emit a warning sound 107 (see FIG. 3) configured to be perceived by the pet 104 when the device 100 detects the pet 104 is pulling. By way of non-limiting examples, the warning sound 107 (see FIG. 3) may include an ultrasonic sound, a clicking noise, and the like. Further, the warning sound 107 may vary over time or include one or more different sounds. For example, the warning sound 107 may be progressive, meaning the configuration (e.g., volume, pitch, and like) of the warning sound 107 may convey more urgency or become more uncomfortable to the pet 104 as the pulling continues or increases in magnitude.

Figure 2:
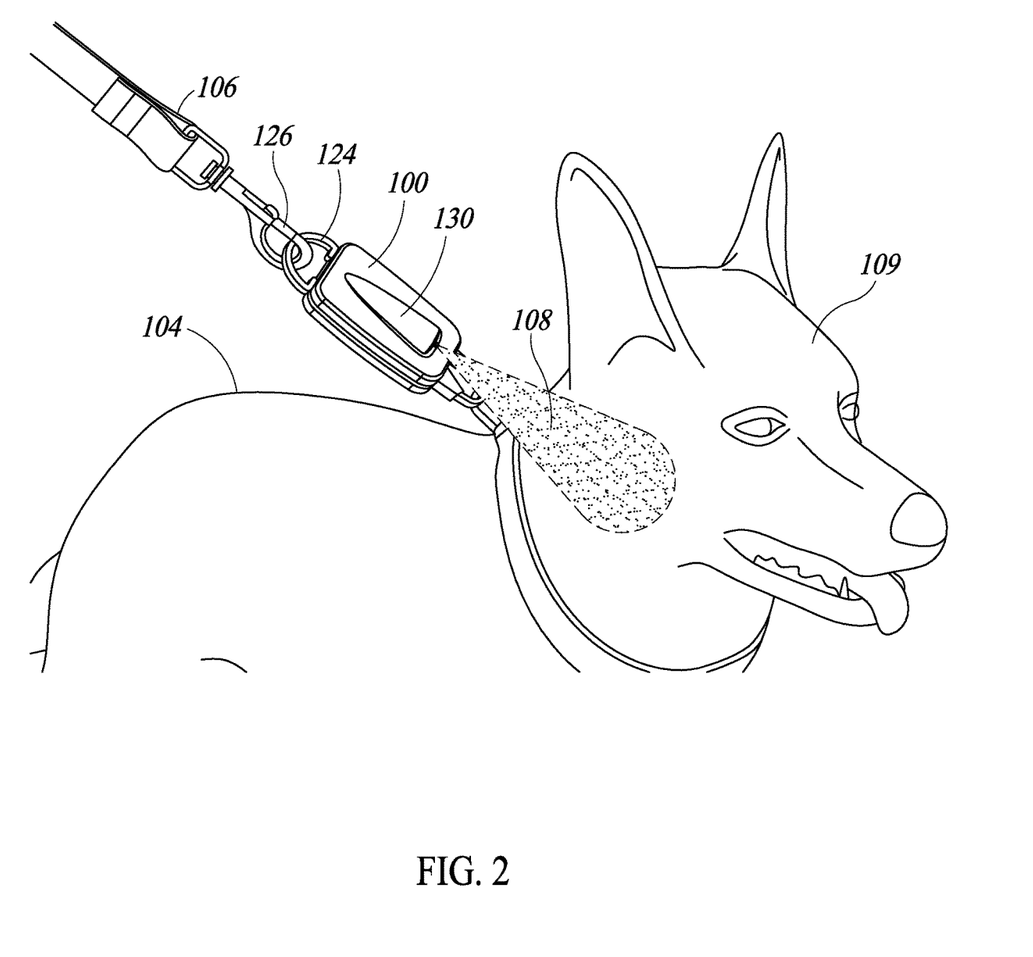
FIG. 2 is a perspective view of the leash accessory device spraying a liquid toward the pet's head.

Referring to FIG. 2, if the pet 104 continues to pull after the warning sound 107 (see FIG. 3) is delivered, the device 100 sprays a liquid 108 toward the pet's head 109. By way of non-limiting examples, the liquid 108 may include water and/or citronella. The pet 104 finds the liquid 108 unpleasant and will learn to associate pulling with the warning sound 107 (see FIG. 3) and to associate the warning sound 107 (see FIG. 3) with being sprayed, which the pet 104 wishes to avoid. Thus, the pet 104 will learn not to pull on the leash 106. For example, the pet 104 may learn not to pull after being sprayed a few times and will stop pulling when the pet 104 perceives the warning sound 107 (see FIG. 3). In other words, the device 100 may teach the pet 104 not to pull on the leash 106 using progressive sound and a deterrent.

Figure 3:
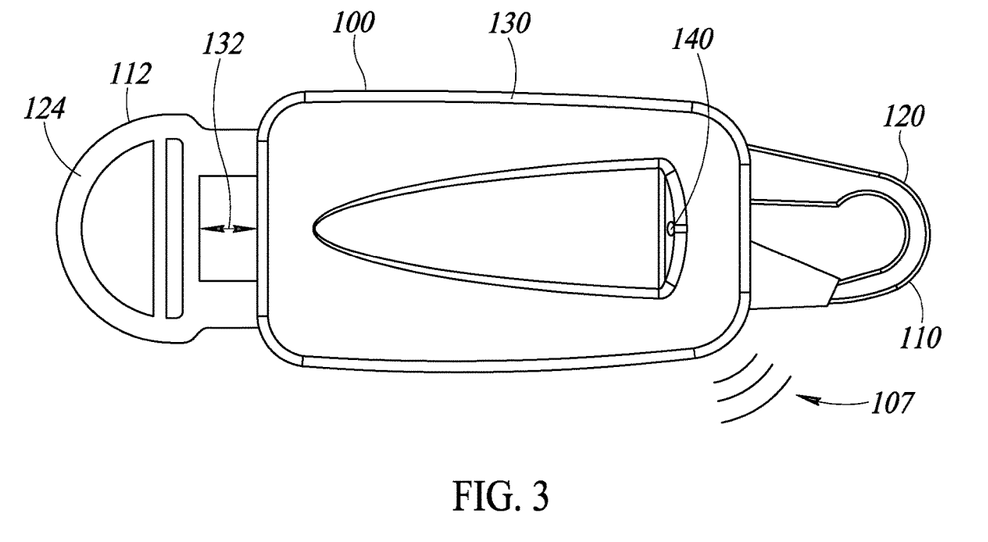
FIG. 3 is a top view of the leash accessory device of FIG. 1.
Figure 4:
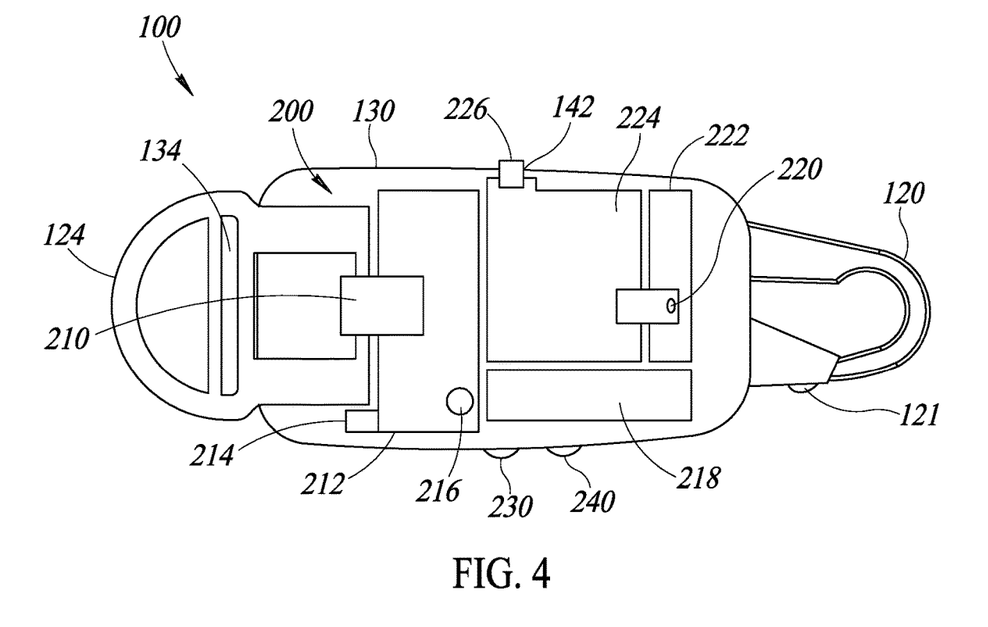
FIG. 4 is a block diagram illustrating a first embodiment of internal components of the leash accessory device of FIG. 1.
Figure 5:
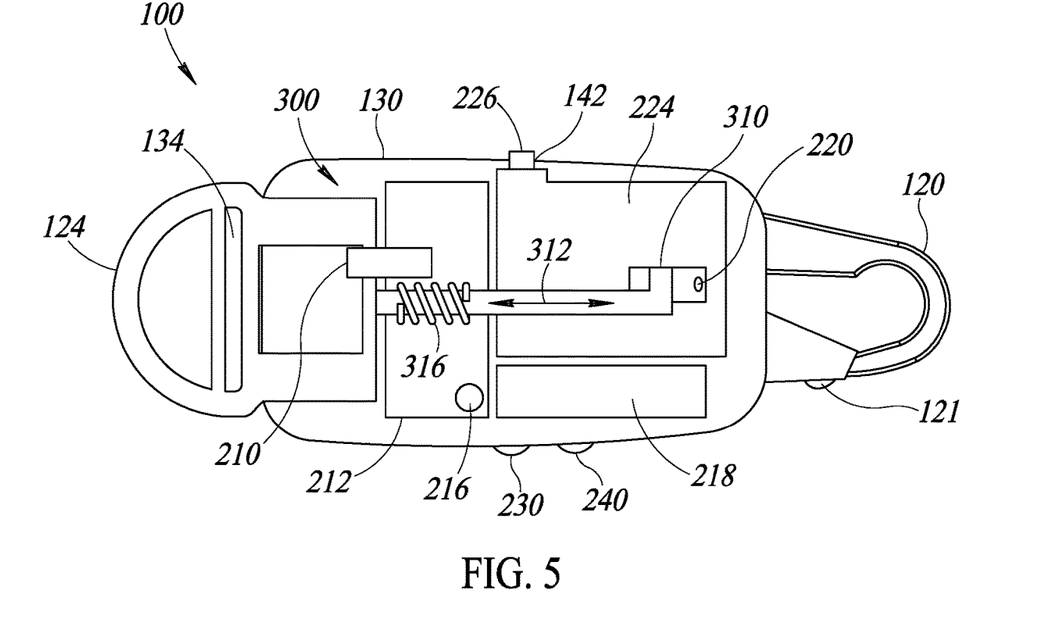
FIG. 5 is a block diagram illustrating a second embodiment of internal components of the leash accessory device of FIG. 1.
Figure 6:
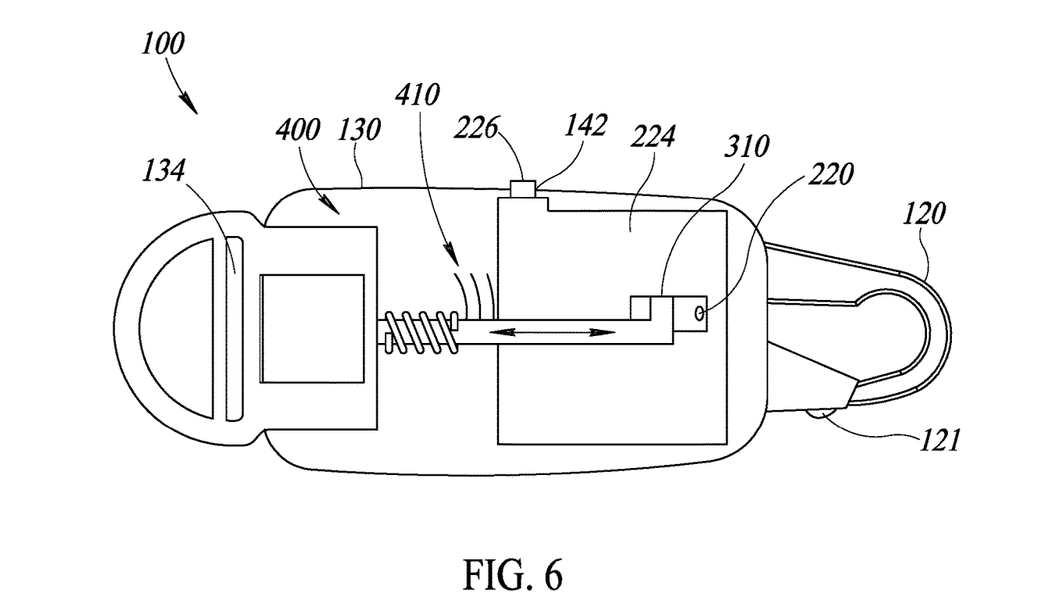
FIG. 6 is a block diagram illustrating a third embodiment of internal components of the leash accessory device of FIG. 1.

FIG. 3 is a top view of the device 100. The device 100 has a distal end 110 opposite a proximal end 112. Referring to FIG. 1, the distal end 110 (see FIG. 3) includes a clasp or clip 120 configured to be attached to a ring 122 on the collar 102 worn by the pet 104. Referring to FIGS. 4-6, the clip 120 may include a spring latch 121 with a thumb pull. However, this is not a requirement.

Referring to FIG. 1, the proximal end 112 (see FIG. 3) is connected to the leash 106. In the embodiment illustrated, the proximal end 112 (see FIG. 3) includes an optional eyelet or loop 124 configured to be gripped by a clasp or clip 126 of the leash 106. Referring to FIG. 3, the optional loop 124 extends into a housing 130. The loop 124 may be slidable with respect to the housing 130 in directions identified by a double-headed arrow 132. However, in alternate embodiments, the proximal end 112 may be connected directly to the leash 106 (see FIGS. 1 and 2). In such embodiments, referring to FIGS. 4-6, the housing 130 may include an opening 134 configured to allow the leash 106 (see FIGS. 1 and 2) to be fed therethrough.

The housing 130 includes an outlet 140 through which the liquid 108 (see FIG. 2) exits the housing 130. The housing 130 may also include an opening 142 (see FIGS. 4-6) through which the liquid 108 (see FIG. 2) may be supplied to the device 100. Thus, the liquid 108 (see FIG. 2) may be refilled.

First Embodiment

FIG. 4 is a block diagram illustrating a first embodiment of internal components 200 positioned inside the housing 130. The internal components 200 include a pull force sensor 210, a printed circuit board ("PCB") 212, a power control 214, one or more speakers 216, one or more batteries 218, a spray nozzle 220, an actuator 222, a tank 224, and a valve 226. Optionally, the internal components 200 may include an indicator light (not shown) that may be implemented as a light emitting diode ("LED"). The indicator light may be connected to the PCB 212. The indicator light may extend through the housing 130 and may be visible to a user when the device 100 is in use.

The tank 224 stores the liquid 108 under pressure. Thus, the tank 224 may be implemented as a pressure tank. The tank 224 is connected to the spray nozzle 220. The spray nozzle 220 is positioned within the outlet 140 (see FIG. 3). The actuator 222 is configured to open the spray nozzle 220 to thereby release the liquid 108 from the tank 224 through the spray nozzle 220. The pressure of the liquid 108 causes the liquid 108 to aerosolize and exit from the spray nozzle 220 and the outlet 140 as fine spray or mist that is perceivable by the pet 104.

The valve 226 is positioned inside the opening 142 and is connected to the tank 224. The valve 226 is configured to channel the liquid 108 (see FIG. 2) supplied by the user into the tank 224. The valve 226 may be implemented as a one-way valve.

The leash 106 (see FIGS. 1 and 2) is connected to the power control 214 (e.g., via the loop 124). When the leash 106 (see FIGS. 1 and 2) is pulled away from the device 100 with a sufficient amount of force (e.g., by the pet 104 pulling on the leash 106), the leash 106 pulls on and activates the power control 214. When the power control 214 is activated, the power control 214 supplies power (from the one or more batteries 218) to the PCB 212, which turns on the PCB 212. The power control 214 may also supply power to the actuator 222, the speaker(s) 216, and the optional indicator light (not shown). Whenever the leash 106 is not being pulled away from the device 100 with the sufficient amount of force for more than a predetermined amount of time (e.g., about 2 seconds to about 5 seconds), the power control 214 may stop supplying power (from the one or more batteries 218) to the PCB 212, which turns off the PCB 212. This may help prevent the one or more batteries 218 from being drained when the pet 104 is not pulling. By way of a non-limiting example, the sufficient amount of force may be about one pound to about two pounds. The one or more batteries 218 may be implemented as one or more rechargeable batteries.

The pull force sensor 210 is connected to the leash 106 (e.g., via the loop 124) and sends an electronic signal to the PCB 212. The electronic signal encodes an amount of pull force detected by the pull force sensor 210. The PCB 212 receives the electronic signal. The PCB 212 contains a logic circuit (not shown) configured to evaluate the electronic signal and determine when to produce the warning sound 107 and when to spray the liquid 108. As mentioned above, the warning sound 107 may be progressive. Thus, the warning sound 107 may have different characteristics depending upon the amount of pull force encoded in the received electronic signal.

For example, the PCB 212 may determine whether the amount of pull force exceeds first, second, or third thresholds. In this example, the first threshold is the lowest value and the third threshold is the highest value. If the amount of pull force exceeds the first threshold, the PCB 212 produces the warning sound 107 (see FIG. 3) using the speaker(s) 216. The warning sound 107 produced may have a first configuration (e.g., volume, pitch, and like). If the amount of pull force exceeds the second threshold, the PCB 212 produces the warning sound 107 (see FIG. 3) using the speaker(s) 216. The warning sound 107 produced after the second threshold is exceeded may have a second configuration (e.g., volume, pitch, and like). The first and second configurations are different from one another with the second configuration conveying a more serious warning (e.g., having a greater volume, higher pitch, and the like) than the first configuration.

If the amount of pull force exceeds the third threshold, the PCB 212 produces the warning sound 107 (see FIG. 3) using the speaker(s) 216 and causes the liquid 108 (see FIG. 2) to be sprayed. The warning sound 107 produced after the third threshold is exceeded may have a third configuration (e.g., volume, pitch, and like). The third configuration is different from both the first and second configurations. The third configuration conveys a punishment and may be more unpleasant (e.g., having a greater volume, higher pitch, and the like) to the pet 104 than the first and second configurations. The PCB 212 causes the liquid 108 (see FIG. 2) to be sprayed by activating the actuator 222, which causes a portion of the liquid 108 stored in the tank 224 to be released therefrom through the spray nozzle 220.

By way of non-limiting examples, the first, second, or third thresholds may be about 5 pounds, about 8 pounds, and about 12 pounds, respectively. Optionally, the device 100 may include a force detection adjustment mechanism 230 that the user may use to set the values of the first, second, or third thresholds. For example, the force detection adjustment mechanism 230 may be used to select a set of pre-set values. By way of a non-limiting example, the sets of pre-set values may include a first set for a small sized dog, a second set for a medium sized dog, and a third set for a large sized dog.

Optionally, the device 100 may include a volume control mechanism 240. The volume control mechanism 240 may be used by the user to set the volume of the warning sound 107 (see FIG. 3) played by the speaker(s) 216.

Second Embodiment

FIG. 5 is a block diagram illustrating a second embodiment of internal components 300 positioned inside the housing 130. In this embodiment, the internal components 300 are substantially similar to the internal components 200 (see FIG. 4). However, the power control 214 (see FIG. 4) and the actuator 222 (see FIG. 4) are omitted from the internal components 300. Thus, the PCB 212 is not switched on and off. Instead, the PCB 212 remains turned on as long as the one or more batteries 218 supply power to the PCB 212. Further, instead of the actuator 222 (see FIG. 4), the internal components 300 include a mechanical actuator 310 that is connected to the loop 124. When the loop 124 moves in the directions identified by the double-headed arrow 132 (see FIG. 3), the loop 124 applies forces to the mechanical actuator 310. For example, when the loop 124 moves outwardly away from the housing 130, the loop 124 applies a pull force to the mechanical actuator 310. The mechanical actuator 310 is configured to move linearly (along direction identified by a double-headed arrow 312) between an open (spraying) position and a closed (not spraying) position. The mechanical actuator 310 includes a biasing member 316 (e.g., a spring, an elastomeric material, and the like) configured to apply a biasing force to the mechanical actuator 310 that biases the mechanical actuator 310 toward the closed position. On the other hand, the pull force applied to the mechanical actuator 310 by the loop 124 pulls the mechanical actuator 310 toward the open position.

In the embodiment illustrated, the mechanical actuator 310 is nearer the proximal end 112 (see FIG. 3) when the mechanical actuator 310 is in the open position than in the closed position. However, in alternate embodiments, the mechanical actuator 310 may be nearer the proximal end 112 (see FIG. 3) when the mechanical actuator 310 is in the closed position than in the open position. In such embodiments, the internal components 300 may include a tube or channel (not shown) configured to direct the liquid 108 (see FIG. 2) from the spray nozzle 220 out through the outlet 140 (see FIG. 3) and toward the pet's head 109. In this embodiment, the pull force sensor 210 is connected to the leash 106 (e.g., via the loop 124) and sends to the PCB 212 the electronic signal encoding the amount of pull force detected by the pull force sensor 210. Like in the first embodiment, the PCB 212 may determine whether the amount of pull force exceeds the first, second, or third thresholds. If the amount of pull force exceeds the first or second thresholds, the internal components 300 function substantially identically to the internal components 200 (see FIG. 4). Additionally, if the amount of pull force exceeds the third threshold, the PCB 212 produces the warning sound 107 (see FIG. 3, optionally having the third configuration) using the speaker(s) 216. However, the PCB 212 does not cause the liquid 108 (see FIG. 2) to be sprayed. Instead, when the biasing force applied to the mechanical actuator 310 by the biasing member 316 is overcome by the pull force applied by the loop 124, the mechanical actuator 310 moves toward the open (spraying) position. When the mechanical actuator 310 reaches the open (spraying) position, the mechanical actuator 310 opens the spray nozzle 220, which causes a portion of the liquid 108 stored in the tank 224 to be released therefrom through the spray nozzle 220. When the amount of pull force no longer exceeds the third threshold, the biasing force applied to the mechanical actuator 310 by the biasing member 316 returns the mechanical actuator 310 to the closed (not spraying) position.

Third Embodiment

FIG. 6 is a block diagram illustrating a third embodiment of internal components 400 positioned inside the housing 130. In this embodiment, the internal components 400 are substantially similar to the internal components 300. However, all of the electrical components are omitted from the internal components 400. Thus, referring to FIG. 5, the internal components 400 (see FIG. 6) omit the pull force sensor 210, the PCB 212, the speaker(s) 216, and the one or more batteries 218. However, as shown in FIG. 6, the internal components 400 include the spray nozzle 220, the tank 224, the valve 226, and the mechanical actuator 310. The mechanical actuator 310 functions as described above with respect to the internal components 300.

The internal components 400 include noise-making elements 410 (e.g., metal tines) configured to produce the warning sound 107 (see FIG. 3). For example, if the noise-making elements 410 are implemented as metal tines, as the mechanical actuator 310 moves toward the open position, the mechanical actuator 310 plucks the metal tines causing them to produce the warning sound 107 (see FIG. 3). The noise-making elements 410 may be configured to produce the warning sound 107 (see FIG. 3) with the first, second, and third configurations based on how close the mechanical actuator 310 is moved toward the open (spraying) position. The noise-making elements 410 are configured not to produce the warning sound 107 (see FIG. 3) when the mechanical actuator 310 moves toward the closed (not spraying) position.

Optionally, the motion of the mechanical actuator 310 may be used to pump the liquid 108 (see FIG. 2) out through the spray nozzle 220. Thus, the liquid 108 may be pumped out through the spray nozzle 220 in a manner similar to how water is pumped out of a squirt gun or squirt bottle.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. A device for use with a leash and a collar configured to be worn by a pet, the device comprising:
   a tank configured to store a liquid;
   a spray nozzle connected to the tank;
   a first connector configured to be attached to the collar;
   a second connector configured to be attached to the leash, a movable one of the first and second connectors being pulled outwardly with respect to the tank when the pet pulls on the leash;
   a movable actuator configured to move between open and closed positions, the movable actuator being moved by the movable connector to an open position when the movable connector is pulled outwardly with an amount of pull force that exceeds a third threshold, the movable actuator being configured to open the spray nozzle thereby causing the spray nozzle to spray the liquid when the movable actuator is in the open position; and
   a biasing member configured to bias the movable actuator toward a closed position, the movable actuator being configured to close the spray nozzle when the movable actuator is in the closed position.

2. The device of claim 1, further comprising:
   at least one noise-making element configured to produce at least one warning sound when the movable actuator moves toward the open position.

3. The device of claim 2, wherein the at least one noise-making element comprises metal tines positioned to be plucked by the movable actuator as the movable actuator moves toward the open position.

4. The device of claim 2, wherein the at least one noise-making element is configured not to produce the at least one warning sound when the movable actuator moves toward the closed position.

5. The device of claim 1, further comprising:
   at least one speaker configured to produce at least one warning sound;
   a pull force sensor connected to the movable connector, the pull force sensor being configured to encode the amount of pull force in an electronic signal and transmit the electronic signal; and
   a circuit configured to receive the electronic signal and cause the at least one speaker to produce the at least one warning sound when the amount of pull force exceeds a first threshold, the third threshold being greater than the first threshold.

6. The device of claim 5, wherein the at least one warning sound comprises first and second warning sounds,
   the first warning sound is different from the second warning sound,
   the circuit is configured to produce the first warning sound when the amount of pull force exceeds the first threshold,
   the circuit is configured to produce the second warning sound when the amount of pull force exceeds a second threshold,
   the second threshold is greater than the first threshold, and
   the third threshold is greater than the second threshold.

7. The device of claim 6, wherein the at least one warning sound comprises a third warning sound,
   the third warning sound is different from each of the first and second warning sounds, and
   the circuit is configured to produce the third warning sound when the amount of pull force exceeds the third threshold.

8. The device of claim 6, further comprising:
   a force detection adjustment mechanism configured to be used by a user to set the first, second, and third thresholds.

9. The device of claim 5, further comprising:
   a volume control mechanism configured to be used by a user to set a volume of the at least one warning sound.

10. The device of claim 1, wherein the liquid is water or citronella or a combination of water and citronella.

11. The device of claim 1, further comprising:
    a housing comprising an outlet and an opening, the tank being positioned inside the housing, the spray nozzle being positioned inside the outlet; and
    a valve connected to the tank and positioned in the opening, the liquid being supplied to the tank through the valve.

12. The device of claim 1, wherein the tank is a pressure tank and the liquid in the tank is under pressure.

13. The device of claim 1, wherein the movable actuator is configured to pump the liquid from the tank and out through the spray nozzle.

14. A device for use with a leash and a collar configured to be worn by a pet, the device comprising:
    a tank configured to store a liquid;
    a spray nozzle connected to the tank;
    an actuator configured to open and close the spray nozzle, the liquid spraying from the tank through the spray nozzle when the spray nozzle is open, the liquid remaining in the tank when the spray nozzle is closed;
    a first connector configured to be attached to the collar;
    a second connector configured to be attached to the leash, a movable one of the first and second connectors being moved with respect to the tank when the pet pulls on the leash;
    a pull force sensor connected to the movable connector, the pull force sensor being configured to encode an amount of pull force in an electronic signal; and
    a circuit connected to the pull force sensor and configured to receive the electronic signal from the pull force sensor, the circuit being configured to cause the actuator to open the spray nozzle thereby causing the spray nozzle to spray the liquid when the amount of pull force exceeds a third threshold.

15. The device of claim 14, further comprising:
    a power control connected to the movable connector, the power control being configured to supply power to the circuit when the leash is pulled away from the device with at least a sufficient amount of force, the power control being configured not to supply power to the circuit when the leash is not being pulled away from the device with at least the sufficient amount of force for more than a predetermined amount of time.

16. The device of claim 14, further comprising:
    at least one speaker configured to produce at least one warning sound, the circuit being configured to cause the at least one speaker to produce the at least one warning sound when the amount of pull force exceeds a first threshold, the third threshold being greater than the first threshold.

17. The device of claim 16, wherein the at least one warning sound comprises first and second warning sounds, the first warning sound is different from the second warning sound, the circuit is configured to produce the first warning sound when the amount of pull force exceeds the first threshold but is less than or equal to a second threshold, the circuit is configured to produce the second warning sound when the amount of pull force exceeds the second threshold, the second threshold is greater than the first threshold, and the third threshold is greater than the second threshold.

18. The device of claim 17, wherein the at least one warning sound comprises a third warning sound, the third warning sound is different from each of the first and second warning sounds, and the circuit is configured to produce the third warning sound when the amount of pull force exceeds the third threshold.

19. The device of claim 17, further comprising:
a force detection adjustment mechanism configured to be used by a user to set the first, second, and third thresholds.

20. The device of claim 16, further comprising:
a volume control mechanism configured to be used by a user to set a volume of the at least one warning sound.

21. The device of claim 14, wherein the liquid is water or citronella or a combination of water and citronella.

22. The device of claim 14, further comprising:
a housing comprising an outlet and an opening, the tank being positioned inside the housing, the spray nozzle being positioned inside the outlet; and
a valve connected to the tank and positioned in the opening, the liquid being supplied to the tank through the valve.

23. The device of claim 14, wherein the tank is a pressure tank and the liquid in the tank is under pressure.

* * * * *